United States Patent
Wolter et al.

(10) Patent No.: US 6,967,819 B1
(45) Date of Patent: Nov. 22, 2005

(54) HEAD SUSPENSION WITH CHIP AS STRUCTURAL ELEMENT

(75) Inventors: Raymond R. Wolter, Hutchinson, MN (US); Rory G. Schmidt, Eden Valley, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 272 days.

(21) Appl. No.: 10/068,814

(22) Filed: Feb. 5, 2002

Related U.S. Application Data

(60) Provisional application No. 60/266,582, filed on Feb. 5, 2001.

(51) Int. Cl.[7] .............................................. G11B 5/596
(52) U.S. Cl. ................... 360/244.1; 360/244.9
(58) Field of Search ........................... 360/244.1, 244.9

(56) References Cited

U.S. PATENT DOCUMENTS

| | | | |
|---|---|---|---|
| 4,991,045 A | 2/1991 | Oberg | |
| 5,103,361 A | 4/1992 | Nagatsuka et al. | |
| 5,400,192 A | 3/1995 | Mizoshita et al. | |
| 5,724,211 A | 3/1998 | Higashiya et al. | |
| 5,793,569 A | 8/1998 | Christianson et al. | |
| 5,802,701 A | 9/1998 | Fontana et al. | |
| 5,862,015 A * | 1/1999 | Evans et al. | 360/244.1 |
| 5,875,071 A | 2/1999 | Erpelding et al. | |
| 5,940,251 A | 8/1999 | Giere et al. | |
| 5,943,191 A | 8/1999 | Giere et al. | |
| 6,014,289 A * | 1/2000 | Goss | 360/244.1 |
| 6,028,748 A | 2/2000 | Kuroe et al. | |
| 6,084,746 A * | 7/2000 | Shiraishi et al. | 360/244.1 |
| 6,108,175 A | 8/2000 | Hawwa et al. | |
| 6,144,530 A * | 11/2000 | Shiraishi et al. | 360/244.1 |
| 6,621,662 B1 * | 9/2003 | Khan et al. | 360/244.1 |

* cited by examiner

Primary Examiner—Robert S. Tupper
(74) Attorney, Agent, or Firm—Faegre & Benson LLP

(57) ABSTRACT

A head suspension or head suspension component for use in supporting a read/write head in a storage device, the head suspension or head suspension component including an integrated circuit chip as a structural element of the head suspension or head suspension component. The chip is included as part of a load beam or as a stiffener for a load beam. A flexure or other gimballing device is mounted to the chip or to a portion of the load beam that is mounted to the chip. The chip may be configured for improved heat dissipation or resonant characteristics. The chip is mounted to head suspension components in various ways, including the use of attachment features formed in the chip. A method of making a head suspension or head suspension component that includes mounting a chip as a structural element of the head suspension or head suspension component is also included.

30 Claims, 11 Drawing Sheets

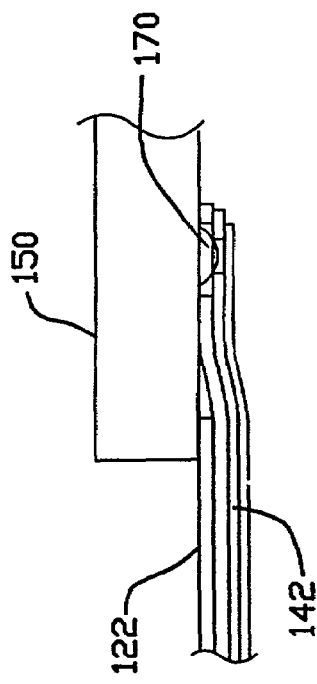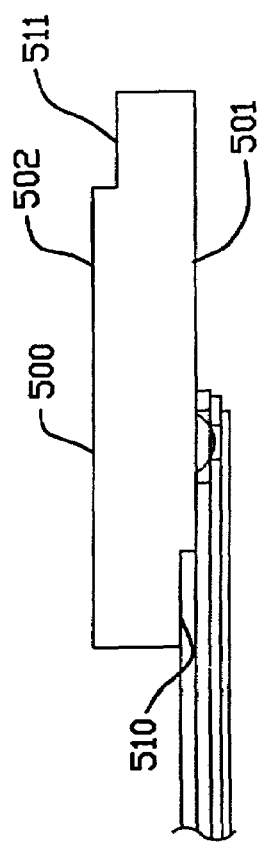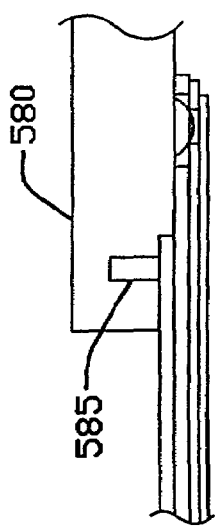

HEAD SUSPENSION WITH CHIP AS STRUCTURAL ELEMENT

This application claims priority to U.S. Provisional Patent Application Ser. No. 60/266,582, filed on Feb. 5, 2001 and entitled HEAD SUSPENSION WITH CHIP AS STRUCTURAL ELEMENT.

FIELD OF THE INVENTION

This invention relates to head suspensions having integrated circuit chips used as structural elements.

BACKGROUND OF THE INVENTION

Head suspensions are well known and commonly used within dynamic magnetic or optical information storage devices or drives with rigid disks. The head suspension is a component within the disk drive that positions a magnetic or optical read/write head over a desired position on the storage media where information is to be retrieved (read) or transferred (written). Head suspensions for use in rigid disk drives typically include a load beam that generates a spring force and that includes a gimbal region or supports a flexure to which a head slider having a read/write head is to be mounted. Head suspensions are normally combined with an actuator arm or E-block to which a mounting region of the load beam is mounted with a base plate so as to position (by linear or rotary movement) the head suspension, and thus the head slider and read/write head, with respect to data tracks of the rigid disk. The rigid disk within a disk drive rapidly spins about an axis, and the head slider is aerodynamically designed to "fly" on an air bearing generated by the spinning disk.

Control of the read/write head of a head suspension is typically handled by electronic circuitry within the disk drive. However, the use of electronic components, such as an integrated circuit chip (IC chip), for signal amplification or other purposes closer to the read/write head is also sometimes desired. In order to shorten the lead length between the read/write head and the IC chip, it has become well known to mount the IC chip on a tail in close proximity to the head suspension or even directly onto the head suspension itself, known as "chip on" technology. However, mounting of the IC chip onto the head suspension may add to the overall weight of the unit and may affect the dynamic response of the suspension.

The dynamic response of the suspension may further be affected by the stiffness of the head suspension. Various methods for controlling the stiffness have been employed in the design of head suspensions, including thickening of the load beam or other head suspension components, the addition of side rails on thinner load beams, and the addition of stiffening members to the load beam or other head suspension components. Use of stiffening members enables improved access time and suspension resonance characteristics by stiffening the suspension without adding as much mass as would result if the entire thickness of the suspension were increased. Such members also eliminate the need to form or otherwise shape the head suspension in order to form side rails or stiffening portions in the suspension. Use of the stiffening member permits the suspension designer to optimize the thickness of the main suspension body for the gimbal and spring regions without needing to provide for rigidity in the load beam region.

SUMMARY OF THE INVENTION

The present invention provides a head suspension or head suspension component for use in supporting a read/write head in a storage device. The head suspension or head suspension component includes an integrated circuit chip as a structural element of the head suspension or head suspension component. The chip is included as part of a load beam or as a stiffener for a load beam, and is attached to one or more head suspension components. In one embodiment, a flexure or other gimballing device is mounted to the chip, in another embodiment a portion of the load beam is mounted to the chip, with a flexure mounted to the load beam portion. The chip may be configured for improved heat dissipation or resonant characteristics. The mounting of the chip to the head suspension components may occur in various ways, including the use of attachment features formed in the chip. Other head suspension components may also be attached to the chip or formed from the chip, including limiters, head lift components, resonance whiskers and gimballing dimples. A method of making a head suspension or head suspension component that includes mounting a chip as a structural element of the head suspension or head suspension component is also provided.

BRIEF DESCRIPTION OF THE SEVERAL VIEWS OF THE DRAWINGS

FIG. 8 is a partial side view of the head suspension of FIG. 1 including electrical attachment of the chip to traces on the head suspension.

FIG. 11a is a side view of a chip for use with the present invention having shelves for attachment to head suspension components.

FIG. 13 is a partial side view of a head suspension in accordance with the present invention including a chip having a mechanical mounting configuration for attachment to head suspension components.

DETAILED DESCRIPTION OF THE INVENTION

With reference to the attached Figures, it is to be understood that like components are labeled with like numerals throughout the several Figures. The head suspension of the present invention takes advantage of the improved electrical performance which can be achieved when an integrated circuit chip ("chip") is mounted onto the suspension, without the downside of increased weight or adverse dynamic affects mentioned above.

Figure 1:
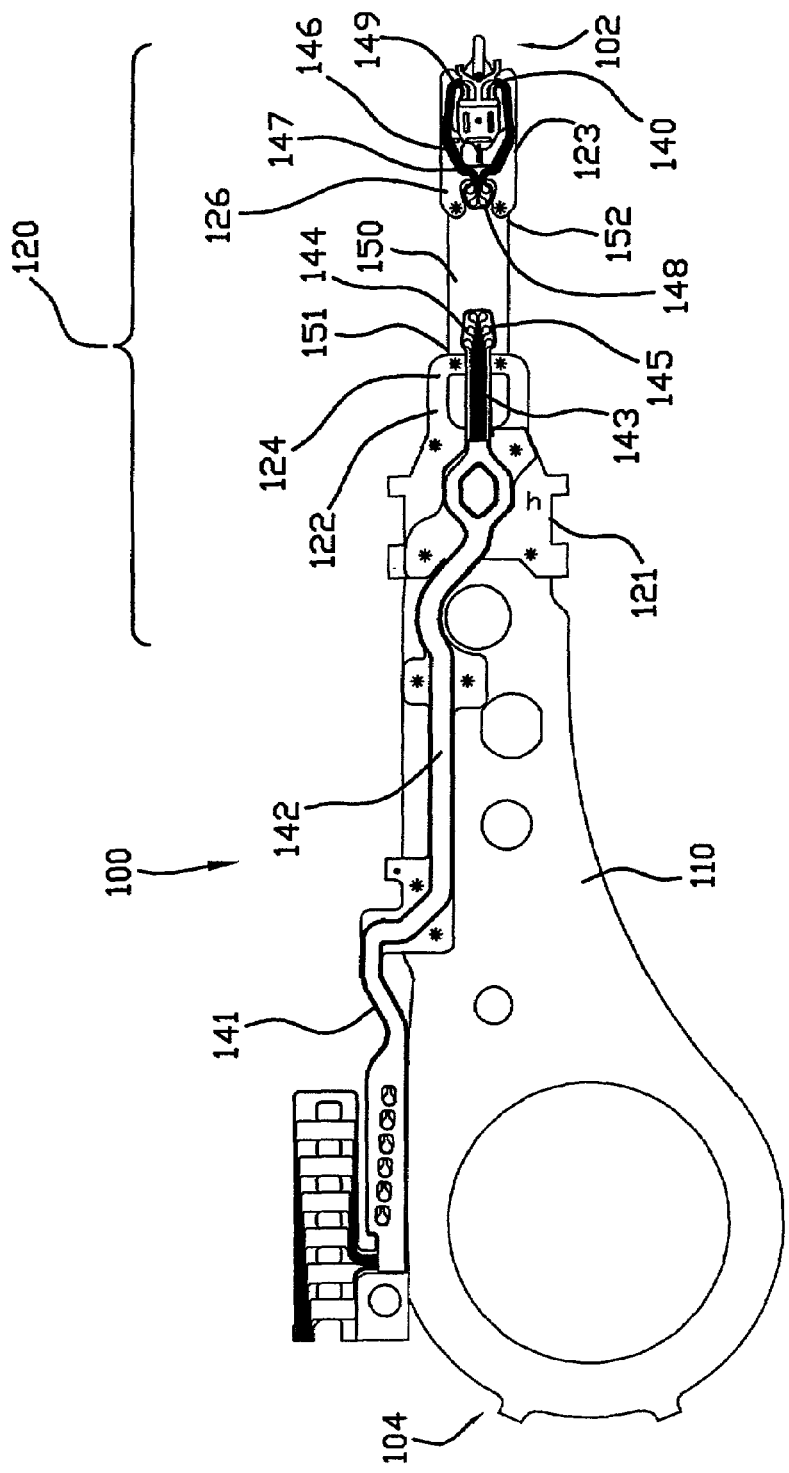
FIG. 1 is a top view of a first embodiment of a head suspension in accordance with the present invention including a chip mounted between load beam components.
Figure 2:
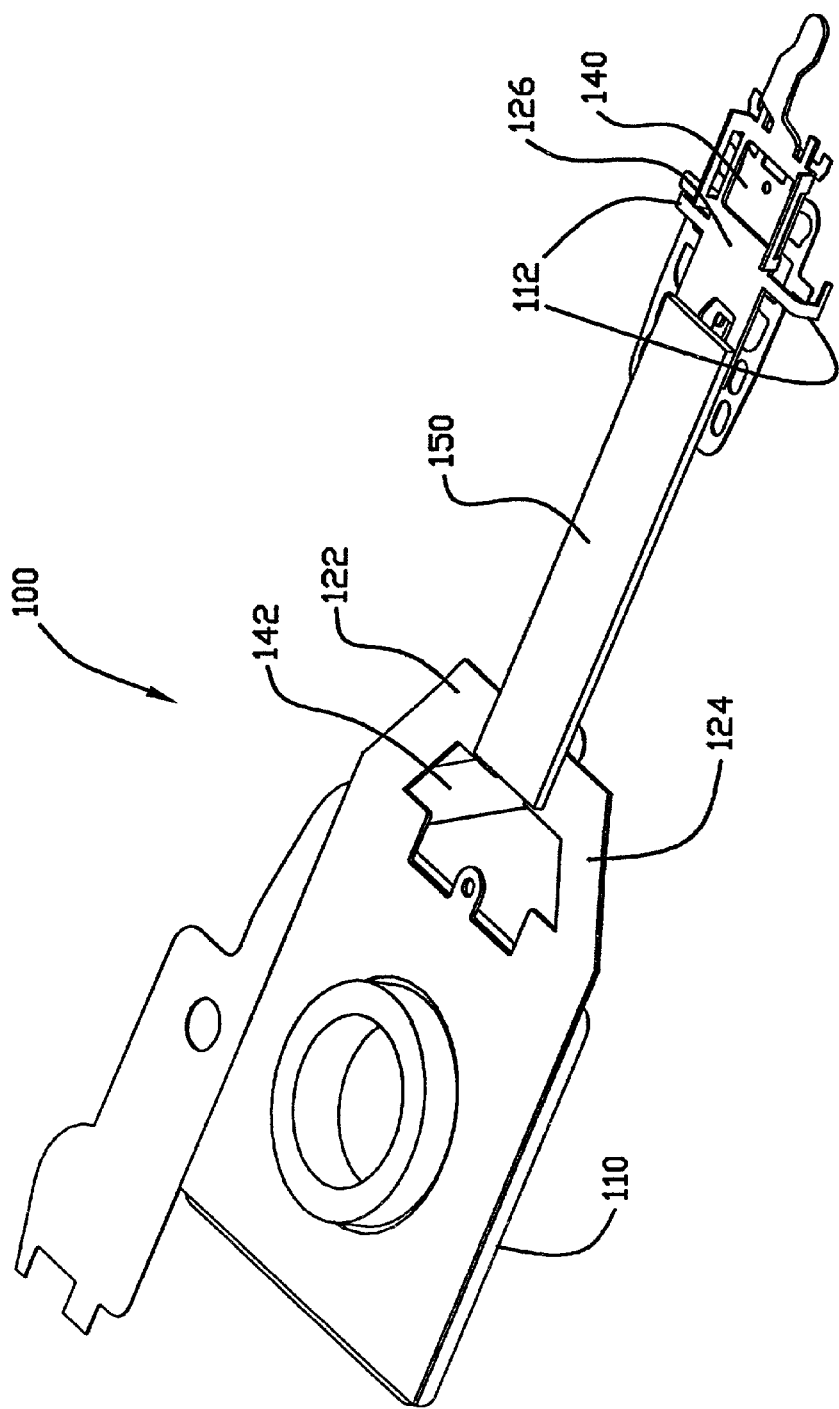
FIG. 2 is a top perspective view of the head suspension of FIG. 1.
Figure 3:
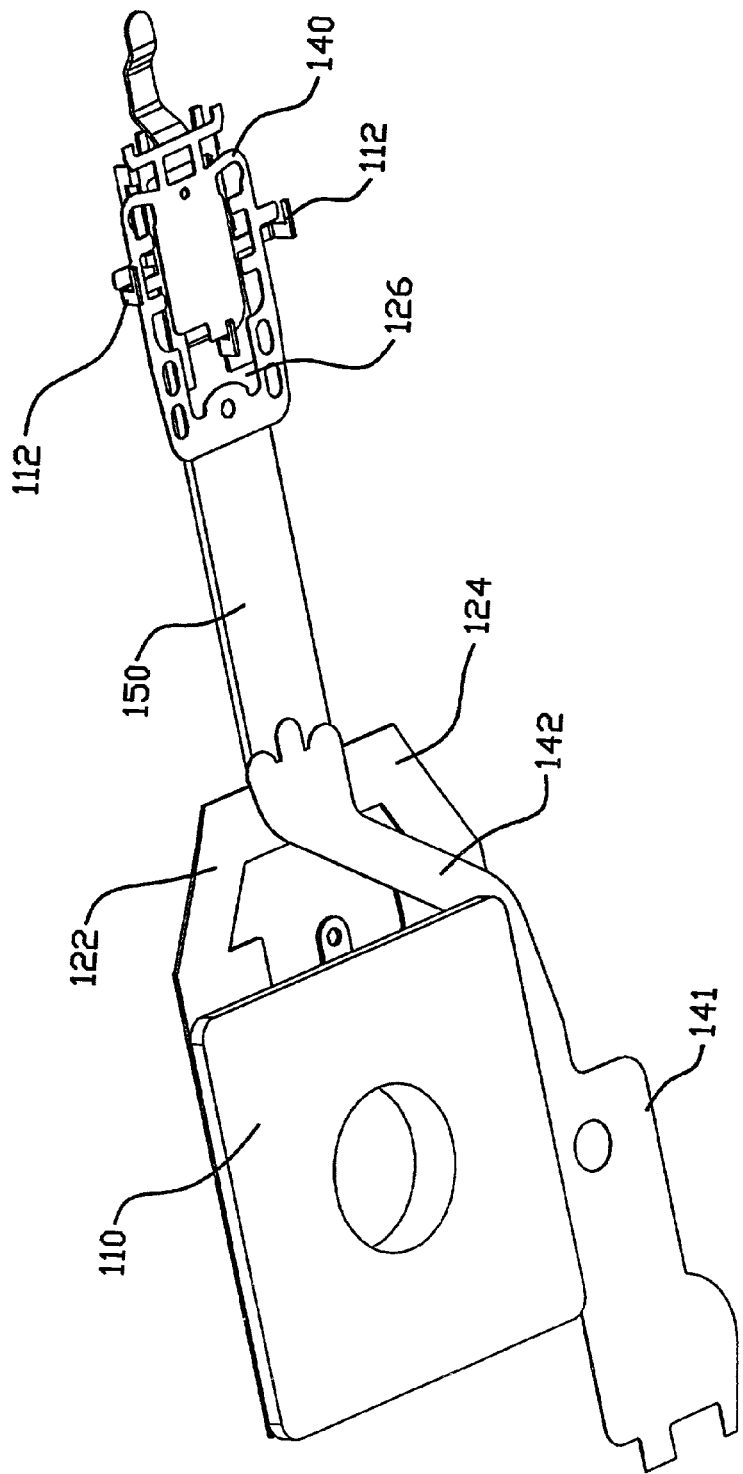
FIG. 3 is a bottom perspective view of the head suspension of FIG. 1.

Referring to FIGS. 1 to 3, a head suspension 100 includes a base plate 110, a load beam 120 and a flexure 140. Traces 142 extend on a tail 141 along the longitudinal length of the head suspension 100 to electrically connect a magnetic head slider (not shown) mounted to the flexure 140 at a distal end 102 of the head suspension 100 with electronic control components (not shown) located off of the head suspension 100 at a proximal end 104 of the head suspension 100. The flexure 140 is mounted to the load beam 120. It provides a resilient connection between the head slider and the load beam 120 and is designed to permit the head slider to gimbal in response to variations in an air bearing generated by rotation of a hard disk (not shown). A dimple or other protrusion (not shown) may be formed in either the load beam 120 or the flexure 140 to provide a point about which the head slider may gimbal. Head lift limiters 112 may also be provided, either on the load beam 120 or the flexure 140, for limiting the lift of the head slider during catastrophic events (such as dropping or bumping of the hard disk unit), thereby reducing or eliminating the possibility of the head slider crashing into the hard disk.

In this embodiment, the load beam 120 of the present invention is formed as two separate components, such as for example a first load beam component 124 and a second load beam component 126. The first load beam component 124 is shown mounted to the base plate 110 of the head suspension 100. The second load beam component 126 is shown mounted to the flexure 140 at the distal end 102 of the head suspension 100. These two load beam components 124, 126 are connected together via an integrated circuit chip ("chip") 150, such as a preliminary amplification chip ("preamp"), MEMS drive circuitry, voltage regulator, capacitor, inductor, resistor, analog and/or digital signal processing circuitry or other suitable electronic component.

The traces 142 are formed in two portions, a first portion 143 extends along the base plate 110 and first load beam component 124, and includes a region extending off of the base plate 110 near the proximal end 104 at the tail 141. A distal end 144 of the first portion 143 terminates on the chip 150 at a proximal end 151 of the chip 150 and is electrically coupled to the chip 150 at trace terminations 145. The proximal end (not shown) of the first portion 143 is electrically coupled to electronic components located off of the head suspension 100, as described above. The first portion 143 transports electrical signals between the chip 150 and these electronic components.

A second portion 146 of the traces 142 extends along the second load beam component 126 and the flexure 140. The proximal end 147 of the second portion 146 terminates on the chip 150 at a distal end 152 of the chip 150 and is electrically coupled to the chip 150 at trace terminations 148. The distal end 149 of the second portion 146 terminates at, and is electrically coupled to, the magnetic head slider so as to transport electrical signals between the head slider and the chip 150. For load beam 120 components formed from a multi-layer laminate, the traces 142 may be formed in a conductive layer with the load beam features formed in a spring metal layer, such as for example stainless steel, before or after removal of the conductive layer and any other layers (i.e., dialectric layer). Alternatively, the traces 142 may be attached to the load beam 120 and/or flexure 140 in a manner know in the art.

Load beams 120 may be formed from stainless steel, or laminates that may include a stainless steel or other spring metal layer, and include multiple regions, such as a mounting region 121, wherein the load beam 120 mounts to the base plate 110, a spring region 122, and a rigid region 123 whose distal end is configured to connect to a flexure 140. In one embodiment of the present invention, the first load beam component 124 is configured to include both the mounting region 121 and the spring region 122, and the second load beam component 126 is configured to include the flexure mounting portion of the rigid region 123 distal end. A portion of the rigid region 123 of the load beam 120 is provided in the present invention by the chip 150 coupled between first and second load beam components 124, 126. In the embodiment shown, a substantial portion or majority of the rigid region 123 of the load beam 120 is formed by the chip 150. However, in other embodiments (including those shown and described below), more or less of the load beam 120 can be functionally and structurally provided by the chip 150, as needed to meet the structural and performance requirements of the head suspension 100.

Figure 4:
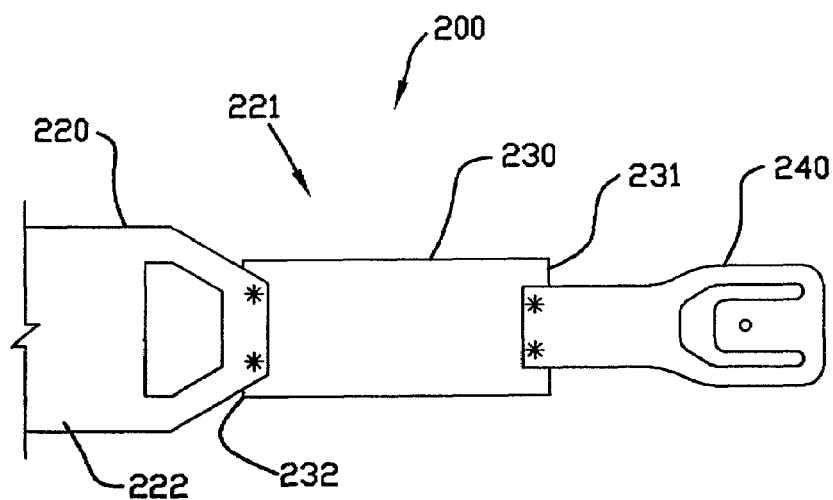
FIG. 4 is a top partial view of a second embodiment of a head suspension in accordance with the present invention including a chip mounted between a load beam component and a flexure.

Referring now to FIG. 4, a second embodiment of a head suspension 200 of the present invention is shown having similar configuration and components as head suspension 100, which are, therefore, not shown. However, in this embodiment, a load beam 220 does not include a second load beam component, such as component 126, but rather has a rigid region 221 provided primarily by a chip 230. As a result, a flexure 240 mounts directly to a distal end 231 of the chip 230, instead of to a separate load beam component, as in the previous embodiment. The chip 230 is mounted to a first load beam portion 222 at a proximal end 232 of the chip 230.

Figure 5:
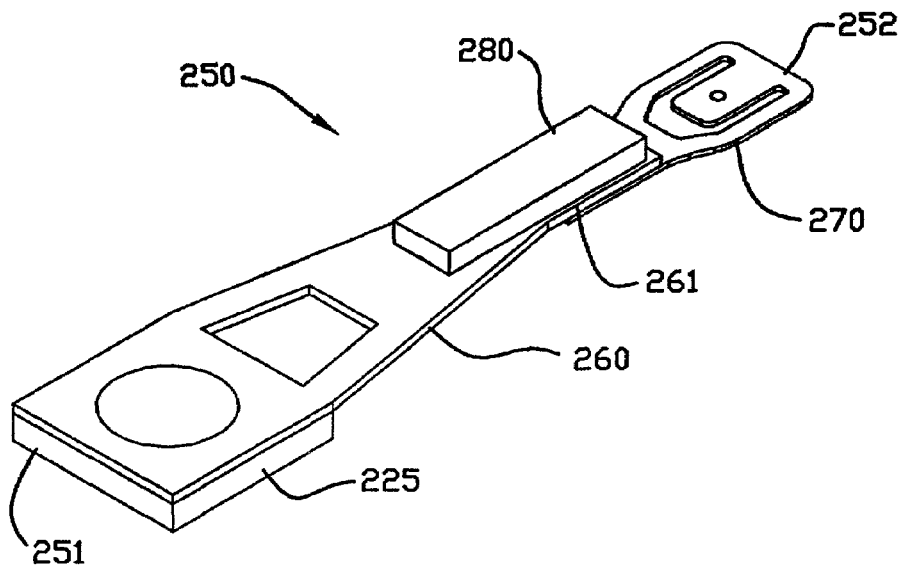
FIG. 5 is a top perspective view of a third embodiment of a head suspension in accordance with the present invention including a chip as a stiffening member mounted to the load beam.

Referring now to FIG. 5, a third embodiment of a head suspension 250 of the present invention is shown having a load beam 260 including a rigid region 261. The head suspension 250 also includes a base plate 225 mounted to a proximal end 251 of the load beam 260 and a flexure 270 mounted to a distal end 252 of the load beam 260. In this embodiment, a chip 280 is mounted to the rigid region 261 of the load beam 260 as a stiffening member, instead of a more traditional stiffening member such as a metal plate or other suitable item. The structural characteristics of the chip 280 provide adequate stiffening for the head suspension 250 while also providing for the electrical requirements of the head suspension 250. When used as a stiffener, the chip 280 may be added to standard or traditional head suspensions designs or may be added to head suspensions specifically designed to be used with such a chip 280. Alternatively, as described in the previous embodiments, the chip may be used to complete the head suspension.

Figure 6:
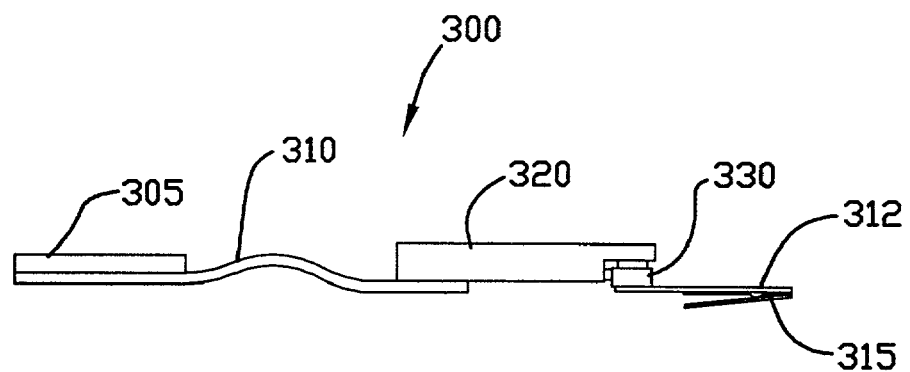
FIG. 6 is a side view of a fourth embodiment of a head suspension in accordance with the present invention including a chip mounted between a load beam component and a MEMS device attached to a flexure.
Figure 7:
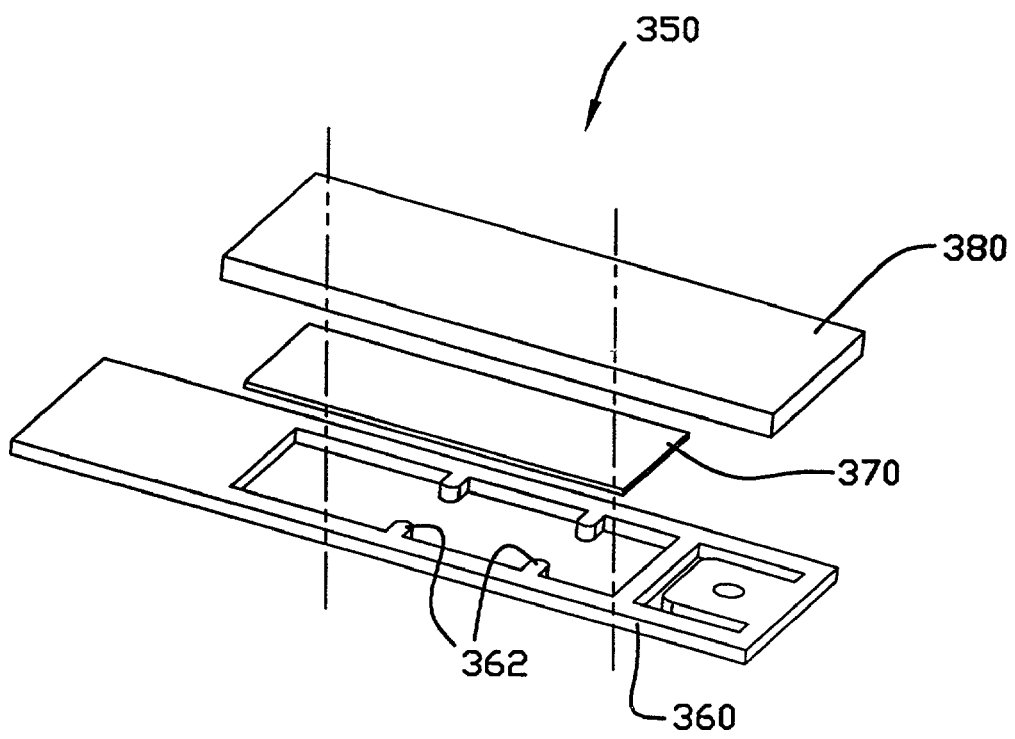
FIG. 7 is a top perspective view of a fifth embodiment of a head suspension in accordance with the present invention including a chip mounted on a MEMS device forming part of the load beam.

Referring now to FIG. 6, a fourth embodiment of a head suspension 300 of the present invention is shown having a first load beam portion 310 mounted to a base plate 305 and a chip 320. A second load beam portion 312 is mounted to a flexure 315 and a micro-electro-mechanical system (MEMS) device 330, which in turn is mounted to the chip 320. Operation of the MEMS device 330 may provide second stage actuation of the head slider on the flexure 315, or may otherwise interact with the head suspension 300. Other configurations of MEMS devices and attachment to the chip 320 are also contemplated and within the scope of the present invention. For example, the MEMS device 330 may connect directly to the flexure 315 without a second load beam portion 312. Alternatively, as shown in FIG. 7, a fifth embodiment of a head suspension 350 of the present invention includes a MEMS device 370 mounted to a flexible load beam 360 at attachment tabs 362. A chip 380 is then mounted relative to (such as on top of) the MEMS device 370, thereby providing a head suspension 350 having both dynamic resonant characteristic response adaptability and a chip mounting configuration.

Figure 15A:
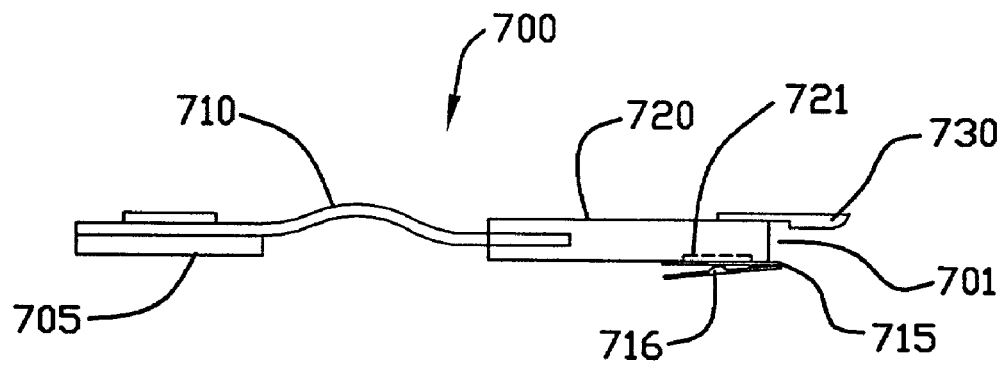
FIG. 15a is a side view of a sixth embodiment of a head suspension in accordance with the present invention including a chip, mounted to a load beam and a flexure with a dimple, including an attached head lift device.
Figure 15B:
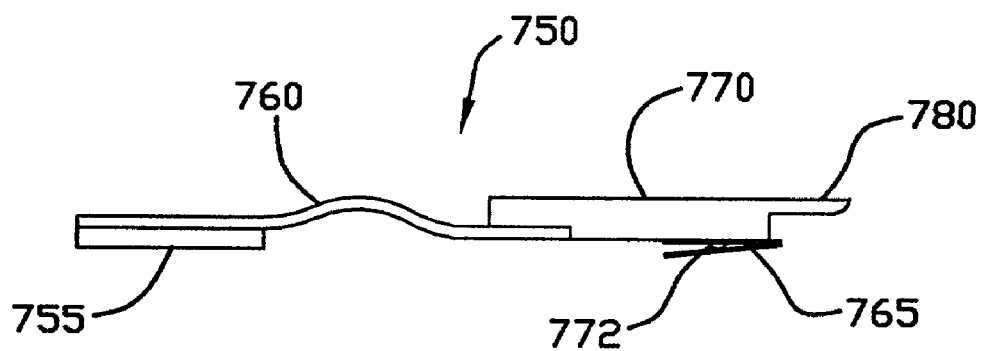
FIG. 15b is a side view of a seventh embodiment of a head suspension in accordance with the present invention including a chip, mounted to a load beam and a flexure, including a dimple and an integrally formed head lift device.

The chip may also be designed to include or contact the dimple. Referring now to FIG. 15a, a sixth embodiment of a head suspension 700 of the present invention is shown including a chip 720 attached to a load beam 710 mounted to a base plate 705. A flexure 715 mounts under the chip 720 and includes a dimple 716 which contacts the chip 720. The chip may be configured to include a stainless steel pad 721 or other appropriate surface for contact with the dimple 716. Alternatively, as shown in FIG. 15b, a seventh embodiment of a head suspension 750 may include a chip 770 attached to a load beam 760 mounted to a base plate 755, with the chip 770 including a dimple 772. The dimple 772 may be etched or otherwise formed from the chip package 770 or attached as a separate component to the chip 770, such as by solder, gold bump, glue bump or other appropriate means. The chip dimple 772 contacts and moves against a flexure 765 to provide the necessary gimballing action for a head slider.

In addition to load beam and flexure components, chips used as structural elements of head suspensions may also be used for other head suspension features. For example, the head lift limiters 112 of the first embodiment head suspension 100 may be formed from the chip 150, or formed as separate components and attached to the chip 150. Optionally, as shown in FIGS. 15a and 15b, a head lift component 730, 780, respectively, may be configured with respect to the chip 720, 770, respectively. In FIG. 15a, a separate head lift component 730 is mounted on top of chip 720 so that the component 730 extends at a distal end 701 of the head suspension 700 to aid in parking the head suspension 700 onto a ramp (not shown) or other suitable location when the disk drive is not being operated. Numerous mounting and attachment methods for the head lift component 730 are possible and are within the scope of the present invention, including, for example, any of the various chip attachment features described below. Alternatively, as shown in FIG. 15b, an integrally formed head lift component 780 may be formed from the chip 770 itself and provided with a suitable profile for moving onto and off of the ramp, as is known in the art. In addition, an optional extension for the absorption of dynamic vibration or the dampening of resonance may be mounted to or formed from the chip. These extensions are sometimes referred to as "resonance whiskers." These extensions are shown and described in U.S. Pat. Nos. 5,940,251 and 5,943,191, owned by the assignee of the present invention, the complete disclosures of which are herein incorporated by reference for all purposes.

Use of a chip as a structural portion of the rigid region of the load beam can provide for a more rigid load beam as compared to a stainless steel load beam. The elastic modulus of stainless steel is about $1.8 \times 10^8$ mN/mm$^2$, as compared to an elastic modulus of $3.93 \times 10^8$ mN/mm$^2$ for a standard chip. Use of a chip also provides a lighter suspension because a chip is a less dense material than stainless steel. That is, silicon has a density of $2.34 \times 10^{-6}$ Kg/mm$^3$, as opposed to $8.07 \times 10^{-6}$ Kg/mm$^3$ for stainless steel. Because of these two features, higher stiffness and lower density, a head suspension of the present invention may be made smaller than a suspension using all stainless steel or other materials. The present invention, therefore, fills the ongoing need for ever smaller suspensions.

With a chip mounted at either end to load beam components, as shown in FIGS. 1–4, 6, 15a and 15b, more surface area of the chip is exposed to air flow under and over the head suspension. More exposure to air flow allows for higher heat dissipation from the chip, which in turn allows for higher power to be used by the chip. Using the chip as a stiffener, as in FIG. 5, or mounting it on a MEMS device as in FIG. 7, provide less heat dissipation from the under side of the chip. However, as described more below, the chip may be provided with other features that increase overall heat dissipation from the chip. The prior art method of mounting a chip without modification onto the surface of the stainless steel load beam provides less direct exposure of the chip surface to air flow because at least a portion of one surface of the chip is mounted to the steel.

A chip itself may be designed both internally and externally to provide improved performance characteristics for the head suspension, including but not limited to mechanical, structural and/or electrical performance. Internally, the various electrical gates, connectors and other desired electrical components may be distributed throughout the chip to provide the necessary electrical performance for the head slider, as well as convenient and suitable connections between the trace portions. Referring to FIG. 8, the chip 150 may be configured for electrical attachment to the traces 142 on the head suspension 100 by the addition of solder bumps 170. Alternatively, other suitable methods of electrical connection between traces and the chip may be used.

Figure 9A:
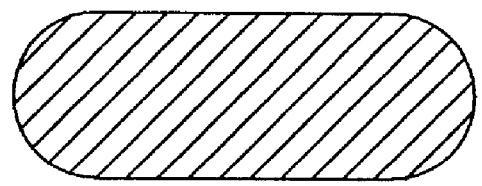
FIG. 9a is a cross sectional end view of a chip for use with the present invention having a rounded edge profile.
Figure 9B:
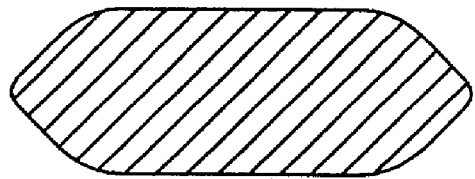
FIG. 9b is a cross sectional end view of a chip for use with the present invention having a tapered edge profile.
Figure 9C:
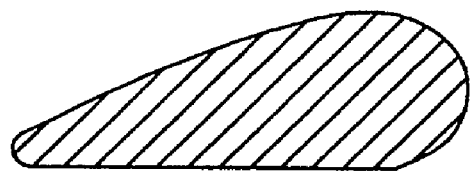
FIG. 9c is a cross sectional end view of a chip for use with the present invention having an aerodynamic profile.
Figure 9D:
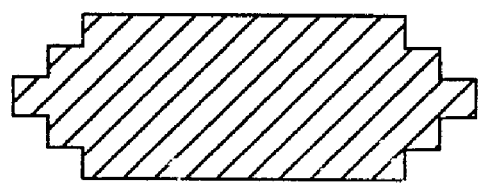
FIG. 9d is a cross sectional end view of a chip for use with the present invention having a stair step profile.
Figure 10A:
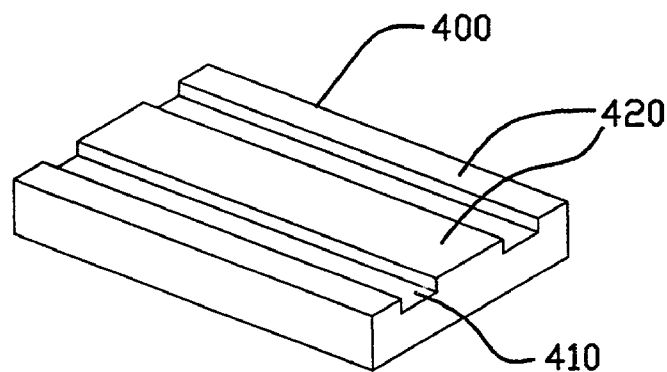
FIG. 10a is a perspective view of a chip for use with the present invention having longitudinal grooves for increases heat dissipation.
Figure 10B:
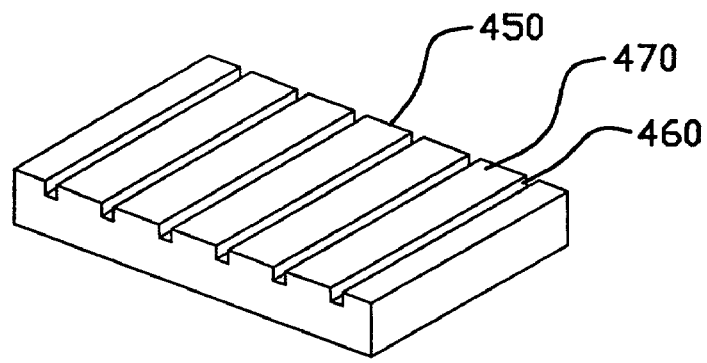
FIG. 10b is a perspective view of a chip for use with the present invention having transverse grooves for increases heat dissipation.

Externally, the chip package may be formed or machined with an airfoil shape to control wind induced vibrations and flutter. Referring now to FIGS. 9*a*, 9*b*, 9*c* and 9*d*, various examples of cross sectional shapes for chips are shown, including but not limited to rounded edges (FIG. 9*a*), tapered, beveled or angled edges (FIG. 9*b*), an aerodynamic shape (FIG. 9*c*) and a stair cut shape (FIG. 9*d*). In addition, the chip may have different surface finishes deposited, machined or otherwise formed onto the surfaces to improve or control wind induced vibrations and/or heat dissipation. For example, referring now to FIGS. 10*a* and 10*b*, two chips 400, 450 are shown having surface finishes including longitudinal grooves 410 and transverse grooves 460 forming heat fins 420, 470 for increasing heat dissipation of the chips 400, 450. Other types, sizes, locations and styles of grooves are also contemplated. Alternatively, texturing of the surface of a chip by material deposition, machining, etching or other suitable methods, may be used to increase surface area to improve heat dissipation. In addition to providing desired external surface characteristics, a chip may also be machined to further reduce the mass associated with the chip. Such variations in chip package geometry may also allow for use with variable thickness components on the head suspension.

Figure 11B:
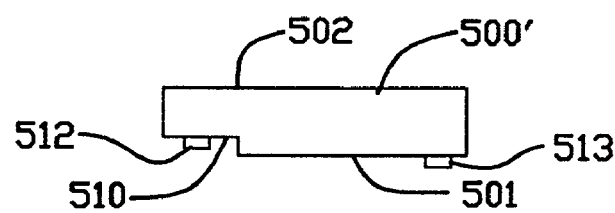
FIG. 11b is a side view of a chip for use with the present invention having shelves including rivet-like members for attachment to head suspension components.
Figure 11C:
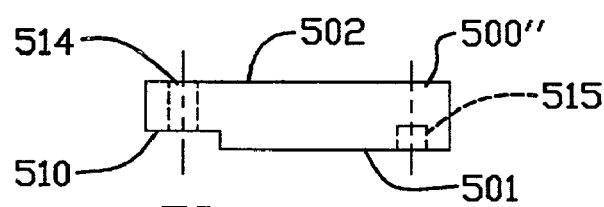
FIG. 11c is a side view of a chip for use with the present invention having shelves including holes for attachment to head suspension components.
Figure 12A:
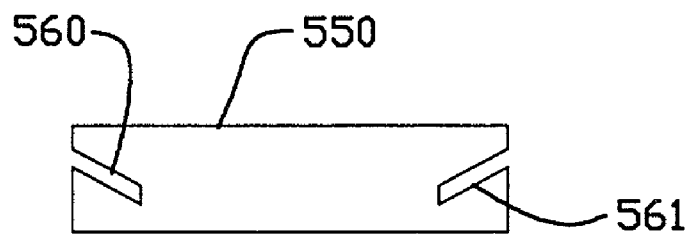
FIG. 12a is a side view of a chip for use with the present invention having angled end slots for attachment to head suspension components.
Figure 12B:
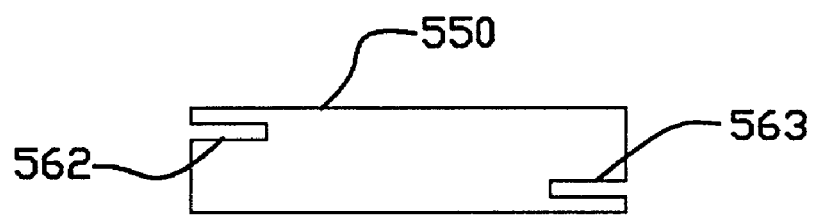
FIG. 12b is a side view of a chip for use with the present invention having offset end slots for attachment to head suspension components.
Figure 12C:
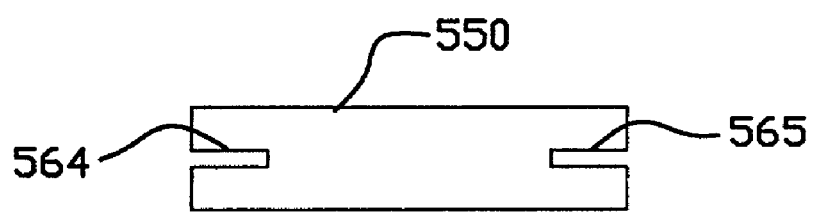
FIG. 12c is a side view of a chip for use with the present invention having aligned end slots for attachment to head suspension components.
Figure 12D:
FIG. 12d is a side view of a chip for use with the present invention having end holes for attachment to head suspension components.

A chip may be mounted to head suspension components in many different ways. For example, in the first embodiment, the chip 150 includes stainless steel weld pads (not shown) formed for weld attachment to the load beam components 124, 126. These weld pads may be formed during the manufacture of the chip 150 itself by deposition of a layer of stainless that is then etched away to leave the weld pads, or by other suitable methods. Alternatively, as shown in FIG. 11*a*, a chip 500 may be formed with an integral shelf or shelves 510, 511 for mounting to head suspension components, which also aid in alignment of the chip 500 on the suspension and/or allow for a lower profile of the chip 500 with respect to the remainder of the suspension. The shelves may be formed on the bottom side 501 (shelf 510), such as for attachment to a load beam, flexure, MEMS, or other components. In addition, or alternatively, the shelves may be formed in the top side 502 (shelf 511), such as for attachment to a head lift component, head lift limiters or other components. As shown in FIG. 11*b*, the chip 500' may optionally include posts 512, 513 (or other rivet-like features) formed with respect to a shelf 510 or a surface 501, 502. In addition, as shown in FIG. 11*c*, the chip 500" may optionally include holes that are through holes 514 or blind holes 515, provided at a surface 501, 502 or with respect to a shelf 510, to aid in mounting the chip 500" to head suspension components. All such mounting features may be provide alone or in combination with each other and/or with other mounting features, such as, but not limited to, those described below.

Figure 14A:
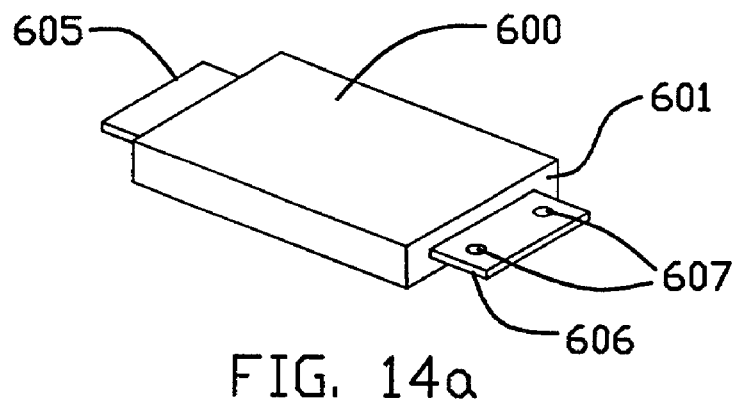
FIG. 14a is a perspective view of a chip for use with the present invention having end tabs for attachment to head suspension components.
Figure 14B:
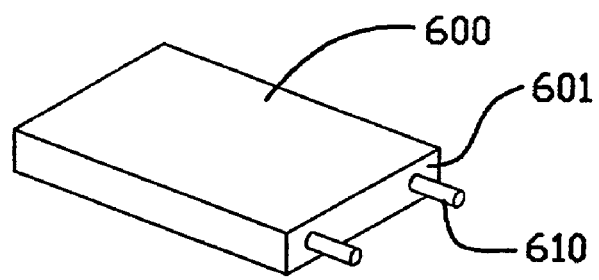
FIG. 14b is a perspective view of a chip for use with the present invention having end rods for attachment to head suspension components.
Figure 14C:
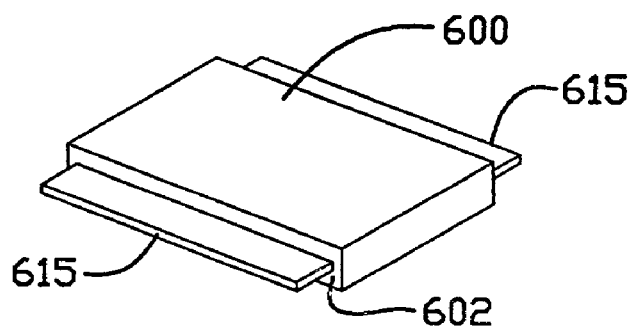
FIG. 14c is a perspective view of a chip for use with the present invention having side rails for attachment to head suspension components.

Referring now to FIGS. 12*a*, 12*b*, 12*c* and 12*d*, a chip 550 may include slots cut on angles 560, 561, offset in height 562, 563, or aligned 564, 565 for insertion of a head suspension component for mounting purposes. Such variation in slot location, angle, and relative placement may provide a desired profile, shape or elevation change for head suspension components. Optionally, chip 550, in FIG. 12*d*, may include holes 566, 567 for use with pins, screws or other fastening methods. These holes 566, 567 may also be angled, offset or aligned, as desired, and/or may include more than one hole 566, 567 at each end. A chip, such as chip 580 in FIG. 13, may also include attachment features for mechanical attachment (such as clips), adhesive attachment (such as adhesive dams), or mechanical/adhesive attachment (such as polymer head stakes), shown diagrammatically as item 585. Other attachment features may also be provided. For example, referring now to FIGS. 14*a*, 14*b* and 14*c*, a chip 600 may be provided with attached or integrally formed handles, tabs, arms, wings, rails, bolts, or other protrusions usable in mounting the chip 600 to head suspension components. In FIG. 14*a*, chip 600 includes end tabs 605, 606, extending from an end 601 of chip 600, which may optionally be provided with holes 607. In FIG. 14*b*, chip 600 includes end protrusions 610 extending from end 601 formed as round or otherwise shaped rods, bolts, fingers, or other suitable members. In FIG. 14*c*, chip 600 includes side rails 615, which may extend along the entire length of the chip 600 (as shown) or may be provided in a shorter length or in multiple pieces along the sides 602 of the chip 600. As is clear from the described examples, many suitable variations on mounting hardware and other attachment features may be provided as would be know by one skilled in the art, and all such variations are contemplated and within the scope of the present invention.

Use of the chip as a structural element of the head suspension has many benefits for the suspension, as described above. In addition, use of the chip provides for benefits in the manufacturing process by allowing for testing of the chip before suspension formation, thereby increasing yields. Use of the chip also eliminates costs related to later chip placement and attachment after manufacture of the suspension. Optionally, added electrical processing capability built into the chip may increase overall savings. Additionally, it may be possible to utilize existing head suspension manufacturing equipment and processes to reduce costs related to changes in the suspension due to use of the chip as a structural element.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A head suspension or head suspension component for use in supporting a read/write head in a storage device, the head suspension or head suspension component comprising a spring region, a flexure and rigid beam region between the spring region and the flexure, wherein the rigid beam region includes an integrated circuit chip that forms a stiffening member extending lengthwise at least half of the length between the spring region and flexure.

2. The head suspension or head suspension component of claim 1, wherein the chip is electrically connected between the read/write head and externally located electrical components.

3. The head suspension or head suspension component of claim 2, wherein the load beam comprises a first portion and a second portion, with the first portion coupled to one end of the chip and the second portion coupled to an opposite end of the chip.

4. The head suspension or head suspension component of claim 3, wherein the first portion comprises a mounting region and a spring region.

5. The head suspension or head suspension component of claim 2, further comprising a flexure and wherein the flexure mounts to the chip.

6. The head suspension or head suspension component of claim 1, further comprising at least one electrical trace electrically coupled to the chip.

7. The head suspension or head suspension component of claim 1, wherein the chip comprises a gimballing dimple.

8. The head suspension or head suspension component of claim 1, wherein the chip contacts a gimballing dimple.

9. The head suspension or head suspension component of claim 1, wherein the chip comprises a head lift limiter.

10. The head suspension or head suspension component of claim 1, wherein the chip is externally shaped to have a rounded edge to minimize wind drag of the head suspension or head suspension component.

11. The head suspension or head suspension component of claim 1, wherein the chip comprises a means for minimizing wind drag of the head suspension or head suspension component.

12. The head suspension or head suspension component of claim 1, wherein the chip comprises an external surface having grooves thereon for heat dissipation.

13. The head suspension or head suspension component of claim 1, wherein the chip comprises engaging structure configured to mechanically engage with a head suspension component.

14. The head suspension or head suspension component of claim 13, wherein the engaging structure comprises at least one of holes, slots, depressions, indentations and grooves.

15. The head suspension or head suspension component of claim 13, wherein the engaging structure is externally protruding from the chip.

16. The head suspension or head suspension component of claim 15, wherein the externally protruding structure comprises at least one of tabs, rails, rods, posts, knobs, loops and resonance whiskers.

17. The head suspension or head suspension component of claim 1, wherein the chip is welded to a head suspension component.

18. The head suspension or head suspension component of claim 1, wherein the chip is adhered to a head suspension component.

19. The head suspension or head suspension component of claim 1, wherein the chip is mechanically fastened to a head suspension component.

20. The head suspension or head suspension component of claim 1, further comprising a MEMS device and wherein the chip is coupled to the MEMS device.

21. The head suspension or head suspension component of claim 1, wherein the chip comprises a head lift component.

22. The head suspension or head suspension component of claim 21, wherein the head lift component is integrally formed from the chip material.

23. The head suspension or head suspension component of claim 21, wherein the head lift component is attached to the chip.

24. A head suspension or head suspension component for supporting a read/write head in a storage device, the head suspension or head suspension component comprising a loadbeam and a flexure, the loadbeam having a rigid region, which comprises an integrated circuit chip occupying at least half of the length of the rigid region and at least half of the width of the rigid region.

25. The head suspension of head suspension component of claim 24, wherein the chip forms at least three fourth of the rigid region.

26. The head suspension or head suspension component of claim 24, wherein the chip has a flat shape with a top major surface and bottom major surface, wherein both top and bottom major surfaces are exposed to the ambient.

27. The head suspension or head suspension component of claim 26, wherein the head suspension or head suspension component has a flat shape with a major top surface and major bottom surface, wherein the major top surface of the chip is exposed to the ambient above the major top surface of the head suspension or head suspension component, and the major bottom surface of the chip is exposed to the ambient below the major bottom surface of the head suspension or head suspension component.

28. The head suspension or head suspension component of claim 27, wherein at least one of the top and bottom major surfaces of the chip is bonded to a base.

29. The head suspension or head suspension component of claim 24, wherein the chip comprises an electrical circuitry and means for controlling wind-induced vibrations of the head suspension or head suspension component.

30. A head suspension or head suspension component for supporting a read/write head in a storage device, the head suspension or head suspension component comprising a loadbeam and a flexure, the loadbeam having a rigid region comprising an integrated circuit chip, which defines an elastic modulus of at least $3.9 \times 10^8$ mN/mm$^2$ in at least half of the length and at least half of the width of the rigid region.

\* \* \* \* \*